(12) United States Patent
Farnetti et al.

(10) Patent No.: US 12,196,350 B2
(45) Date of Patent: Jan. 14, 2025

(54) VARIABLE ROUTING CLAMP

(71) Applicant: Micron Technology, Inc., Boise, ID (US)

(72) Inventors: Cristofer Anthony Farnetti, Boise, ID (US); Maxwell Lewis Bennett, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/815,337

(22) Filed: Jul. 27, 2022

(65) Prior Publication Data

US 2024/0035592 A1 Feb. 1, 2024

(51) Int. Cl.
*F16L 3/10* (2006.01)

(52) U.S. Cl.
CPC ................... *F16L 3/1058* (2013.01)

(58) Field of Classification Search
CPC ................... F16L 3/1058; F16L 3/10
USPC ...................... 248/68.1, 74.2, 74.4
See application file for complete search history.

(56) References Cited

U.S. PATENT DOCUMENTS

| | | | | |
|---|---|---|---|---|
| 5,742,982 A * | 4/1998 | Dodd | ................ | G02B 6/44785 |
| | | | | 248/74.1 |
| 5,931,423 A * | 8/1999 | Heideloff | .............. | F16L 3/2235 |
| | | | | 248/219.3 |
| 6,308,921 B1 * | 10/2001 | Borzucki | ................ | F16L 3/237 |
| | | | | 248/68.1 |
| 9,142,946 B2 * | 9/2015 | Krager | ...................... | H02G 3/32 |
| 10,221,994 B2 * | 3/2019 | Baiera | ...................... | F16L 3/237 |
| 10,274,109 B2 * | 4/2019 | Kozan | ................ | B60R 16/0215 |
| 2008/0121764 A1 * | 5/2008 | Komsitsky | ............ | F16L 3/2235 |
| | | | | 248/74.3 |
| 2010/0148018 A1 * | 6/2010 | Schoenau | ................ | F16L 5/14 |
| | | | | 248/74.4 |
| 2010/0193651 A1 * | 8/2010 | Railsback | ............. | F16L 3/2235 |
| | | | | 248/229.24 |
| 2012/0009012 A1 * | 1/2012 | Allenbach | ............. | F16L 3/2235 |
| | | | | 403/344 |
| 2016/0076689 A1 * | 3/2016 | Kato | ...................... | F16L 3/1091 |
| | | | | 248/636 |
| 2017/0030486 A1 * | 2/2017 | Sampson | .............. | F16L 3/2235 |
| 2017/0030487 A1 * | 2/2017 | Sampson | .............. | F16L 55/035 |

* cited by examiner

*Primary Examiner* — Muhammad Ijaz
(74) *Attorney, Agent, or Firm* — Harrity & Harrity, LLP

(57) ABSTRACT

Implementations described herein relate to a variable routing clamp. In some implementations, a routing clamp may include a rigid body defining a channel. The routing clamp may include a flexible cushion that is configured to be inserted into the channel, where the flexible cushion includes two or more through holes extending through the flexible cushion that are configured to receive flexible lines, and where distances between the two or more through holes satisfy a threshold. The routing clamp may include a rigid cap that is configured to be fastened to the rigid body over an opening of the channel, where the rigid cap includes one or more lips that are configured to restrict movement of the flexible cushion after the flexible cushion is inserted into the channel.

25 Claims, 15 Drawing Sheets

VARIABLE ROUTING CLAMP

TECHNICAL FIELD

The present disclosure generally relates to clamping devices and, for example, to a variable routing clamp.

BACKGROUND

A clamp is a fastening device used to hold or secure objects tightly together to prevent movement or separation through the application of inward pressure. There are many types of clamps that are designed for different purposes. Some clamps are designed to temporarily position components while fixing them together. Other clamps are designed to permanently hold or secure objects together. As an example, a routing clamp, such as a cable clamp or a P-clamp, may be used to mechanically fasten lines (such as hoses, pipes, and/or wires, among other examples) along a route.

DETAILED DESCRIPTION

Figure 1:
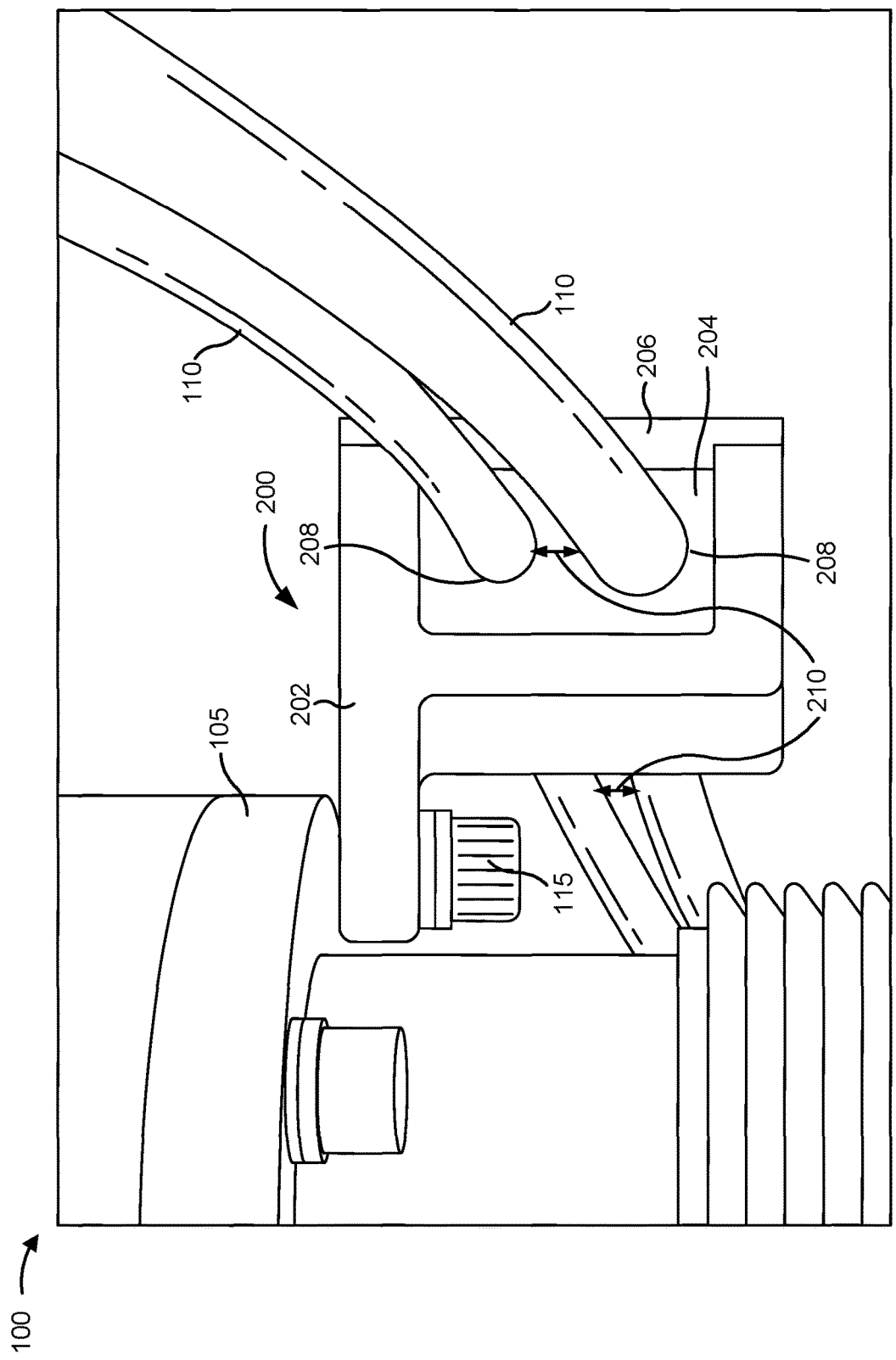
FIG. 1 is a diagram illustrating an example system including a clamp.

In some cases, a clamp, such as a routing clamp, may be used to secure lines to a device or system. For example, a routing clamp may be used to secure cables, tubes, wires, and/or pipes, among other examples, to the device or the system. In some examples, the device or the system may include one or more moving components. For example, the routing clamp may secure lines to a component of a device that is configured to move periodically, cyclically, and/or on-demand. As an example, the routing clamp may secure lines to a robotic arm of a surface-mount component placement system (e.g., a pick-and-place system), to a spray arm of a particle sprayer, and/or to another robotic component that is associated with cyclical motions.

Typically, a routing clamp may secure or bundle multiple lines (e.g., multiple cables, tubes, wires, and/or pipes) together by securing the lines together to prevent movement or separation through the application of inward pressure. For example, the multiple lines may pass through a single opening of the routing clamp. The routing clamp may be configured to apply inward pressure at the single opening to secure the lines to a device. This may cause the multiple lines to be bundled together by the routing clamp such that the multiple lines are in contact with one another. This may introduce one or more problems, such as when the routing clamp is used to secure the multiple lines to a moving device.

For example, as the device moves, the multiple lines may experience interfacial chafing caused by the multiple lines rubbing together, against the routing clamp, and/or on a surface of the device. This may cause the multiple lines to degrade and/or fail over time (e.g., the interfacial chafing may cause wear on a line which may cause a failure of the line). Additionally, the interfacial chafing may cause particle generation. For example, abrasion or interfacial friction caused by two or more lines rubbing together may result in particles (e.g., nanoparticles) being emitted. The particle generation may result in a degradation of an operation associated with the device to which the routing clamp secures the multiple lines. For example, the device may be associated with a semiconductor fabrication process. In such examples, unintended particle generation (such as from the multiple lines experiencing interfacial chafing) within an environment (e.g., a chamber) associated with the semiconductor fabrication process may degrade a quality of the semiconductor product. As another example, as the device moves, the multiple lines may bend or kink because the multiple lines may be bundled together by the routing clamp. This may restrict flow of a fluid or gas through the lines and/or may result in a failure of one or more of the lines.

Further, environments in which the routing clamp may be used to secure multiple lines may be associated with limited or tight spatial requirements. For example, an environment in which the routing clamp is deployed may have limited space for the clamp such that a size of the routing clamp is restricted and/or a quantity of routing clamps that can be deployed in a given location is limited. As a result, due to the limited or tight spatial requirements of the environment, only a single clamp having a size that complies with the spatial requirements may be used to secure the lines to a device.

Some implementations described herein are associated with a variable routing clamp. For example, the variable routing clamp may include a body, a flexible cushion, and/or a cap. The body may include a base portion and an upper portion that defines a channel. The cushion may be configured to be removably inserted into the channel. The cushion may include multiple through holes extending through the flexible cushion. The multiple through holes may be configured to receive and inhibit movement of respective flexible lines. In some implementations, a distance between two through holes, of the multiple through holes, may satisfy a threshold. The cap may be configured to be fastened to the body over an opening of the channel. In some implementations, the cap includes one or more lips that are configured to restrict movement of the cushion after the flexible cushion is inserted into the channel.

In some implementations, the body and/or the cap may be rigid components, whereas the cushion may be a flexible component. For example, after the cushion is inserted into the channel of the body and the cap is fastened to the body, the cap and the body may apply an inward pressure on the cushion to cause the cushion to clamp down on lines running through the multiple through holes. In some implementations, a single flexible line may run through a given through hole of the multiple through holes. In some implementations, the variable routing clamp may be secured or otherwise fixed to a device. The device may be associated with one or more chemical applications. In some implementations, a first material of the body, a second material of the cushion, and a third material of the cap may be compatible with the one or more chemical applications, as described in more detail elsewhere herein.

As a result, the variable routing clamp may ensure that a spatial separation is maintained between two or more lines that are being secured to a device by the variable routing clamp (e.g., as the device moves). For example, because the cushion includes multiple through holes that are separated by distances (e.g., threshold distances) and because a single flexible line may run through a given through hole of the multiple through holes, a distance (e.g., a spatial separation) between multiple flexible lines being secured by the variable routing clamp may be maintained. As a result, as the device moves, the multiple flexible lines may not come into contact, thereby reducing (or eliminating) interfacial chafing between the multiple flexible lines.

Additionally, this may enable a single variable routing clamp to be used to secure multiple flexible lines while also maintaining a spatial separation between the multiple flexible lines, thereby enabling the variable routing clamp to be used in environments with tight spatial requirements. Further, because components of the variable routing clamp may be compatible with one or more chemical applications associated with a device to which the variable routing clamp is secured, the material(s) of the variable routing clamp may not chemically react or degrade in an environment in which the one or more chemical applications are performed. Moreover, the variable routing clamp may be variable in that the cushion is removable from the body. For example, different cushions having different configurations or orientations of through holes may be interchanged with the same body to secure different types of flexible lines, different quantities of flexible lines, and/or different sizes of flexible lines, among other examples, using the same variable routing clamp to secure different configurations of flexible lines at different instances. This improves a flexibility of an application of the variable routing clamp and/or reduces a cost associated with securing different configurations of flexible lines (e.g., because a single body and/or cap may be used for the different configurations of flexible lines, rather than requiring multiple bodies and/or caps for respective different configurations), among other examples.

FIG. 1 is a diagram illustrating an example system 100 including a clamp 200. As shown in FIG. 1, the system 100 may include a variable routing clamp (e.g., the clamp 200). The clamp 200 may be fixed to a device 105. The system 100 may include one or more flexible lines 110. For example, as shown in FIG. 1, the system 100 may include two flexible lines 110. In other examples, the system 100 may include different quantities of flexible lines 110 or different types of flexible lines 110 than those depicted in FIG. 1.

The device 105 may be configured to spin, rotate, extend, and/or otherwise move. In some implementations, the device 105 may be a robotic device, a semiconductor manufacturing device, a particle sprayer, and/or another device with one or more moving components. As shown in FIG. 1, the clamp 200 may be fixed to the device 105 via a fastener 115. For example, the fastener 115 may pass through an opening or hole in the clamp 200 (e.g., as described in more detail elsewhere herein) to secure or fasten the clamp 200 to the device 105. The fastener 115 may include a screw, a bolt, and/or a stud, among other examples. In some implementations, the flexible lines 110 may be secured to the device 105 via multiple clamps 200 that are positioned at different points along a route of the flexible lines 110.

The flexible lines 110 may include a tube, a wire, an air line (e.g., a pneumatic line), a hydraulic line, a conduit, a flexible pipe, and/or a cable, among other examples. In some implementations, the flexible lines 110 may have a same configuration and/or size (e.g., each flexible line 110 secured by the clamp 200 may be the same). In other implementations, the flexible lines 110 may have different configurations and/or sizes. In some implementations, the clamp 200 may secure different types of flexible lines 110 to the device 105. For example, a first flexible line 110 may be a tube and a second flexible line 110 may be a wire.

The clamp 200 may include a body 202, a cushion 204, and a cap 206. The components of the clamp 200 (e.g., the body 202, the cushion 204, and the cap 206) are described in more detail elsewhere herein. As shown in FIG. 1, the body 202 and the cap 206 may secure the cushion 204. The cushion 204 may include two or more through holes 208 (e.g., extending through the cushion 204) that are configured to receive the flexible lines 110. In other words, the clamp 200 may be configured to restrict a movement of the one or more flexible lines 110 and maintain a spatial separation 210 between the one or more flexible lines 110 and the device 105 and/or another surface when the device 105 is moving.

For example, as shown in FIG. 1, a single flexible line 110 may pass through a given through hole 208. The through holes 208 may enable the flexible lines 110 to maintain the spatial separation 210 while also securing the flexible lines 110 to the device 105. For example, the through holes 208 may enable the flexible lines 110 to maintain the spatial separation 210 while the device 105 moves. This may reduce a likelihood that the flexible lines 110 come into contact during an operation of the device 105, thereby reducing a likelihood of interfacial chafing between the flexible lines 110. This may reduce a wear of the flexible lines 110 and/or reduce particle generation caused by the interfacial chafing between the flexible lines 110 and/or between a surface of the device 105 (or of an environment in which the device 105 operates). For example, as shown in FIG. 1, the clamp 200 may secure the flexible lines 110 a distance away from the device 105 and/or other surfaces of the environment in which the device 105 operates. This may reduce a likelihood of interfacial chafing between a flexible line 110 and another surface (e.g., of the device 105 or of the environment).

In some implementations, the device 105 and/or the system 100 may be associated with one or more chemical applications. As used herein, "chemical application" may refer to a process or operation that is associated with one or more chemical compounds or elements. For example, a chemical application may include a spraying of a chemical substance or compound. As another example, a chemical application may include a fabrication process that is associated with an application or emittance of a chemical substance or compound. For example, the device 105 may be associated with a sprayer that sprays particles of a chemical substance or compound.

In some implementations, the body 202, the cushion 204, and the cap 206 may include respective materials that are compatible with the one or more chemical applications of the device 105. As used herein, "compatible" may refer to chemical compatibility or material compatibility. For example, a material may be "compatible" with a chemical application if when the material comes into contact with a substance associated with the chemical application, a harmful chemical reaction does not occur. For example, a material compatible with a chemical application may not rust, degrade, synthesize or precipitate another substance, decompose, combust, and/or experience another harmful chemical reaction. A first material of the body 202, a second material of the cushion 204, and a third material of the cap 206 may be compatible with the one or more chemical applications of the device 105. As a result, no harmful chemical reactions and/or degradation of the material(s) of the clamp 200 may occur when the one or more chemical applications of the device 105 are performed.

As an example, a chemical application of the device 105 may include an application of ammonium hydroxide (NH₄OH) and hydrogen peroxide (H₂O₂). In such examples, the material(s) of the clamp 200 may be compatible (e.g., chemically compatible) with ammonium hydroxide and hydrogen peroxide. As another example, a chemical application of the device 105 may include an application of tetramethylammonium hydroxide (TMAH). In such examples, the material(s) of the clamp 200 may be compatible (e.g., chemically compatible) with TMAH.

In some implementations, the first material of the body 202, the second material of the cushion 204, and the third material of the cap 206 may be different materials. In some implementations, the first material of the body 202, the second material of the cushion 204, and the third material of the cap 206 may be the same material. In some implementations, the body 202 and the cap 206 may include a first material and the cushion 204 may include a second material. As an example, where the device 105 is associated with a chemical application that is associated with ammonium hydroxide, hydrogen peroxide, and/or TMAH, the first material (of the body 202) and the third material (of the cap 206) may be stainless steel or polyether ether ketone (PEEK), among other examples that are compatible with ammonium hydroxide, hydrogen peroxide, and/or TMAH. Additionally, the second material (of the cushion 204 may) may include rubber, a flexible rubber material, polytetrafluoroethylene (PTFE) (sometimes referred to as TEFLON®), and/or ethylene propylene diene monomer (EPDM) rubber, among other examples that are compatible with ammonium hydroxide, hydrogen peroxide, and/or TMAH.

In some implementations, the body 202 may be a rigid body and the cap 206 may be a rigid cap. For example, the first material of the body 202 and the third material of the cap 206 may be a rigid material (e.g., may be associated with a hardness value or a stiffness value that satisfies a first threshold). As used herein, a "rigid" component (e.g., a rigid body or a rigid cap) may refer to a component that includes a rigid material. The cushion 204 may be a flexible cushion. For example, the second material of the cushion 204 may be a flexible material (e.g., may be associated with a hardness value or a stiffness value that satisfies a second threshold). As used herein, "flexible" component (e.g., a flexible cushion) may refer to a component that includes a flexible material. This may enable the body 202 and the cap 206 (e.g., being rigid materials) to apply an inward pressure on the cushion 204 when the cap 206 is fixed to the body 202. Because the cushion 204 is a flexible material, when the inward pressure is applied to the cushion 204, the cushion 204 may flex to secure the flexible lines 110 that are passing through the through holes 208, thereby securing or inhibiting a movement of the flexible lines 110.

As indicated above, FIG. 1 is provided as an example. Other examples may differ from what is described with regard to FIG. 1.

Figure 2A:
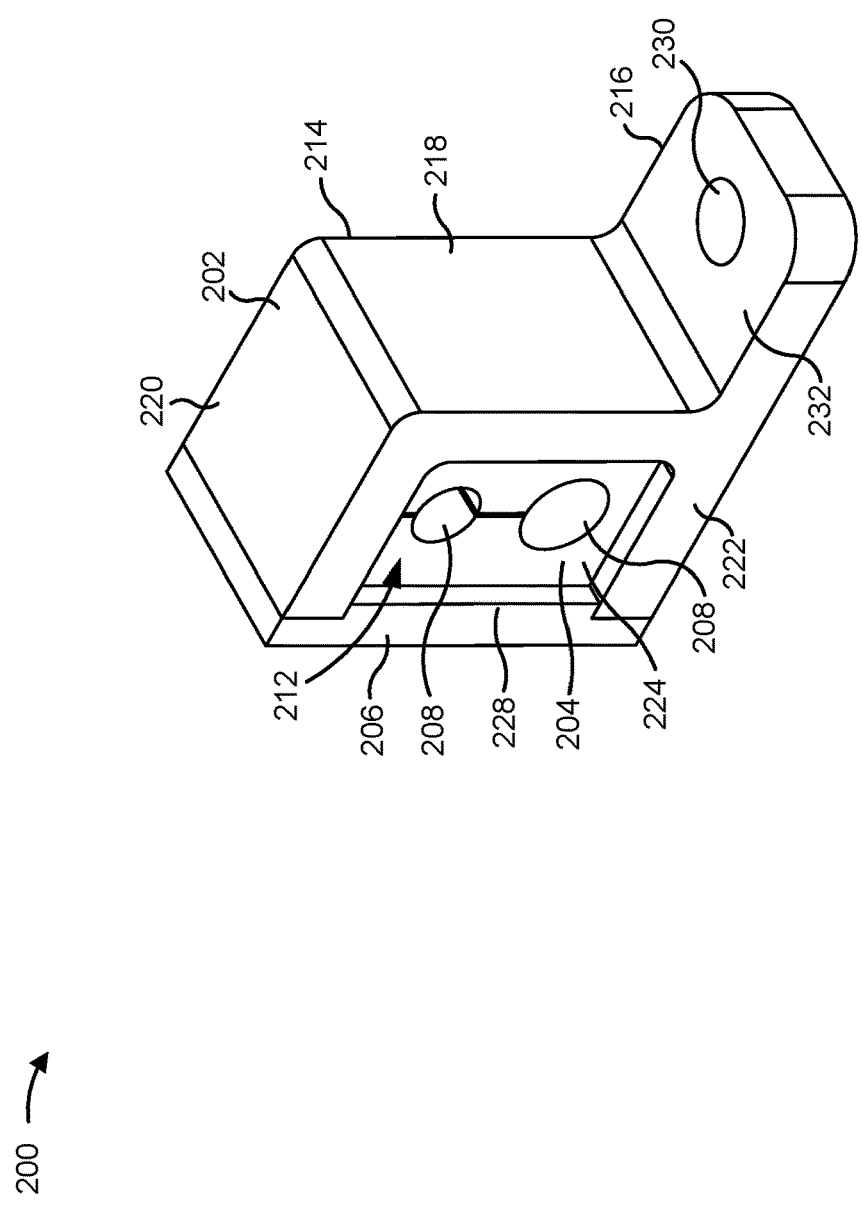
FIGS. 2A-2C are diagrams illustrating examples of the clamp.
Figure 2B:
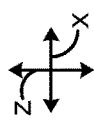
Figure 2B:
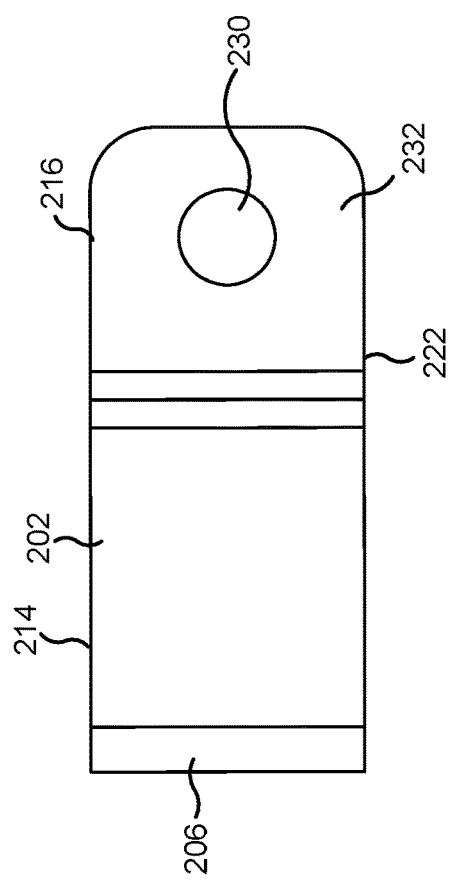
Figure 2C:
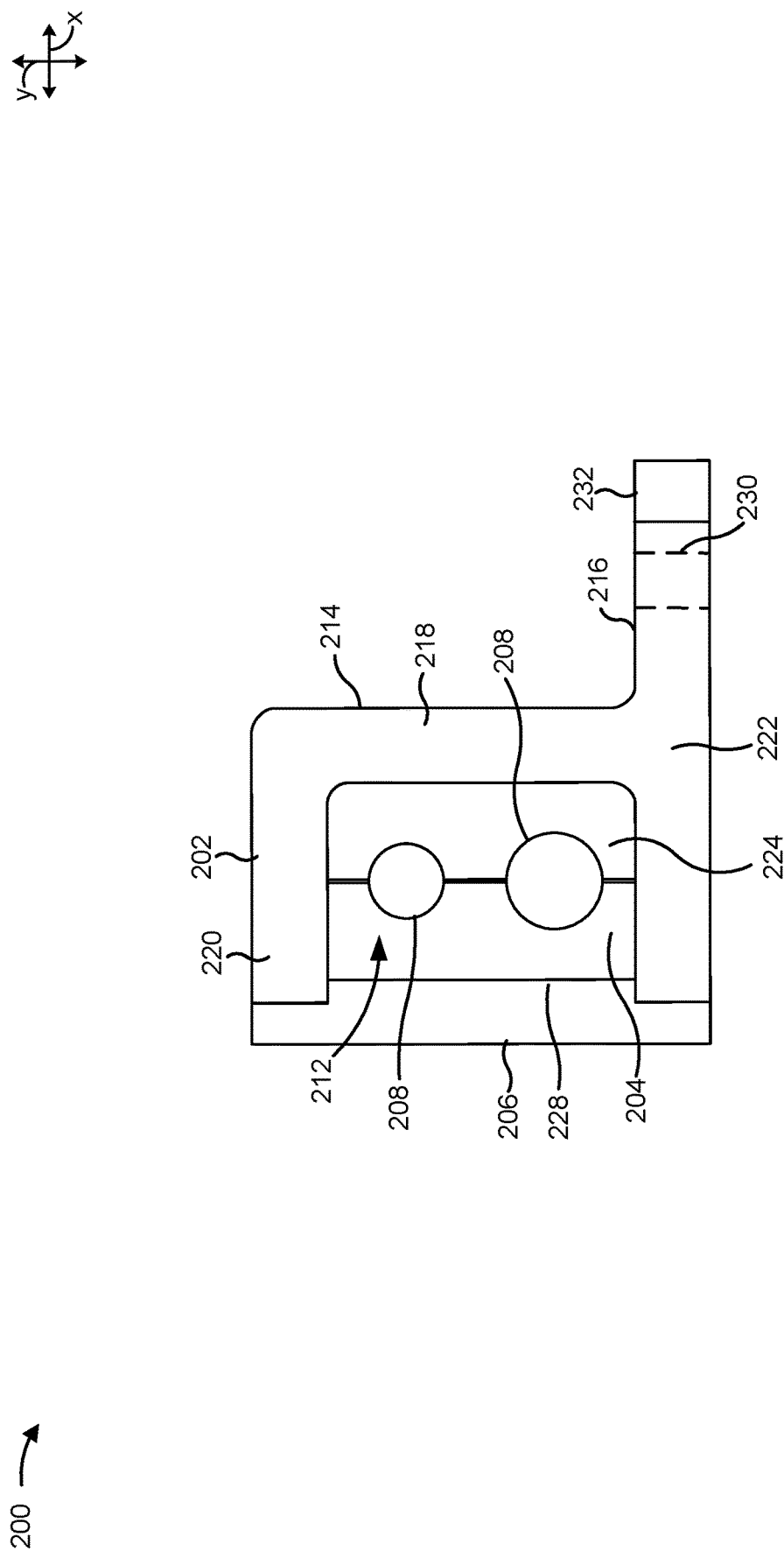

FIGS. 2A-2C are diagrams illustrating examples of the clamp 200. For example, FIG. 2A is a diagram illustrating a perspective view of the clamp 200. FIG. 2B is a diagram illustrating a top view of the clamp 200. FIG. 2C is a diagram illustrating a front view of the clamp 200.

As shown in FIGS. 2A-2C, the cushion 204 may be inserted into a channel 212 of the body 202. The cushion 204 may be removable from the channel 212. In other words, the cushion 204 may not be permanently fixed within the channel 212. This may enable the clamp 200 to be variable such that different cushions 204 (e.g., having different configurations of through holes 208) may be used with the same body 202 and the same cap 206.

The body 202 may include an upper portion 214 and a base portion 216. The channel 212 may be included in the upper portion 214 (e.g., the upper portion 214 may define the channel 212). In some implementations, the upper portion 214 and the base portion 216 may be integrally connected (e.g., may be a single piece) as shown in FIGS. 2A-2C. For example, the base portion 216 and the upper portion 214 may be included in a single unitary piece forming the body 202. In some other implementations, the upper portion 214 and the base portion 216 may be separate pieces that are fixed together (e.g., via one or more fasteners or another mechanical connection). For example, the base portion 216 and the upper portion 214 may be separate pieces forming the body 202.

The upper portion 214 may include a first member 218 extending substantially perpendicular from the base portion 216. The upper portion 214 may include a second member 220 extending substantially perpendicular from the first member 218 (e.g., and substantially parallel to the base portion 216). The base portion 216, the first member 218, and the second member 220 may define the channel 212.

In some implementations, one or more (or all) dimensions of the channel 212 may be based on dimension(s) of the cushion 204. For example, a height of the channel 212 (e.g., along a y-axis) may be equal to or close to (e.g., within a tolerance of) a height of the cushion 204 (e.g., along the y-axis). A depth of the channel 212 and/or of the body 202 (e.g., along a z-axis) may be based on a depth of the cushion 204 (e.g., along the z-axis). In some implementations, the depth of the channel 212 and/or of the body 202 may be larger than the depth of the cushion 204. For example, as shown in FIG. 2A, there may be a distance between a front face 222 of the body 202 and a front face 224 of the cushion 204. There may be a similar (or the same) distance between a back face of the body 202 and a back face of the cushion 204 (not shown in FIGS. 2A-2C). The depth of the channel 212 and/or of the body 202 being larger than the depth of the cushion 204 may enable the cushion 204 to be inserted into a recess 226 (not shown in FIGS. 2A-2C) of the body 202, as described in more detail elsewhere herein.

The cap 206 may be configured to be fastened to the body 202 over an opening of the channel 212. For example, one or more screws, bolts, pins, and/or other fasteners may be used to mechanically connect the cap 206 to the body 202. The cap 206 may be configured to restrict or inhibit a movement of the cushion 204 (e.g., after the cushion 204 is inserted into the channel 212). For example, the cap 206 may restrict a movement of the cushion 204 along an x-axis. Additionally, the cap 206 may include one or more lips 228. The one or more lips 228 may be configured to restrict movement of the cushion 204 (e.g., after the cushion 204 is inserted into the channel 212). For example, the one or more lips 228 may be configured to restrict movement of the cushion 204 along the z-axis.

As shown in FIGS. 2A-2C, the body may include one or more apertures 230. The one or more apertures 230 may be configured to receive the one or more fasteners 115 to fasten the clamp 200 to the device 105. For example, the one or more apertures 230 may be included in the base portion 216. In some implementations, the base portion 216 may include a tab 232 that extends away from the upper portion 214 and/or the channel 212 (e.g., along the x-axis). The one or more apertures 230 may be included in (e.g., may pass through) the tab 232. This may place a connection point for connecting the clamp 200 to the device 105 a distance away from where the flexible lines 110 are clamped by the clamp 200. For example, including the one or more apertures 230 may enable the connection point to be a distance (e.g., along the x-axis) away from the through holes 208 of the cushion 204. This may enable the flexible lines 110 to be clamped a distance away from a surface of the device 105. As a result, a risk of interfacial chafing between the flexible lines 110 and the surface of the device 105 may be reduced.

Each of the illustrated x-axis, y-axis, and z-axis in FIGS. 2A-2C is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

As indicated above, FIGS. 2A-2C are provided as examples. Other examples may differ from what is described with regard to FIGS. 2A-2C.

Figure 3A:
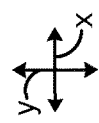
FIGS. 3A-3C are diagrams illustrating examples of a body of the clamp.
Figure 3A:
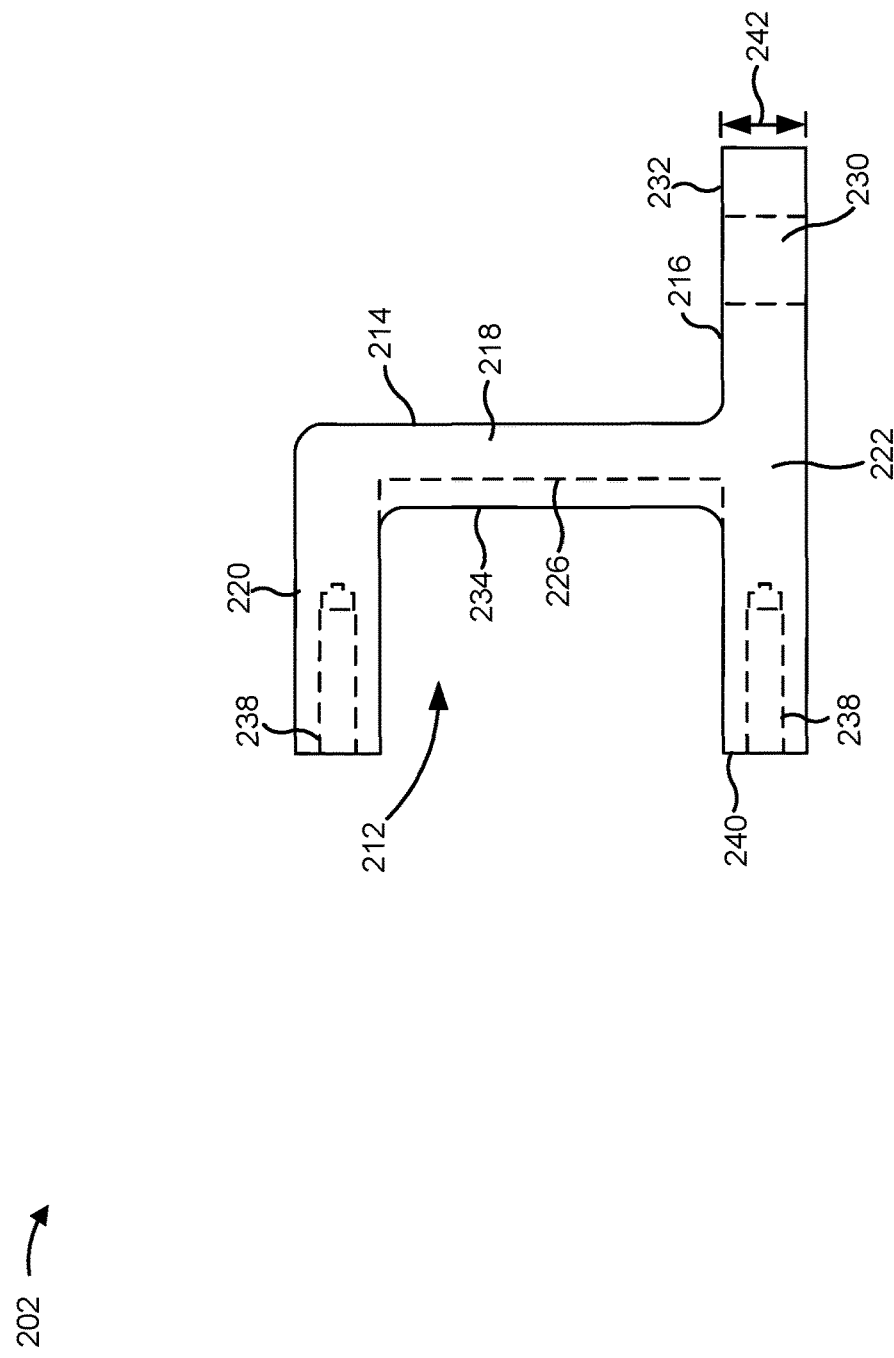
Figure 3B:
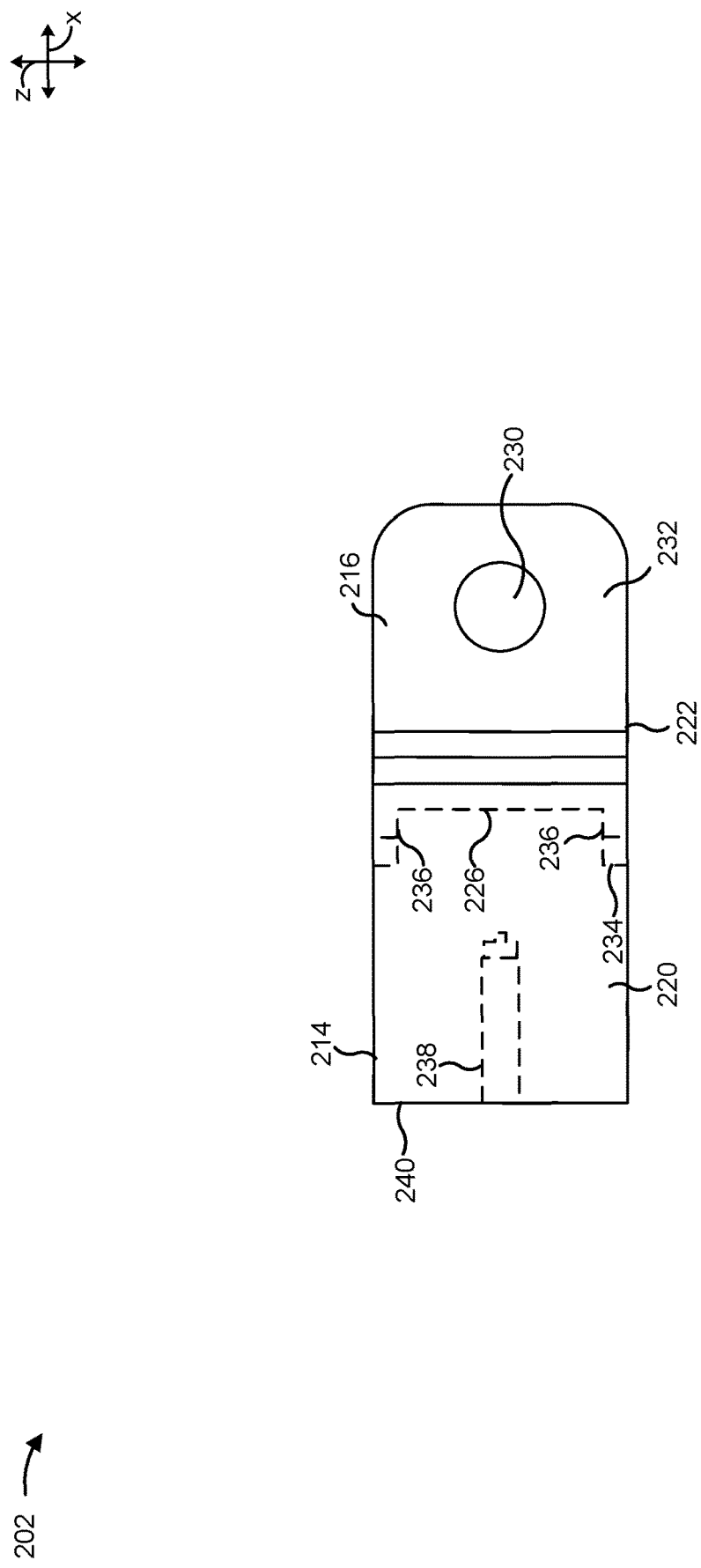
Figure 3C:
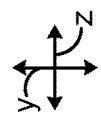
Figure 3C:
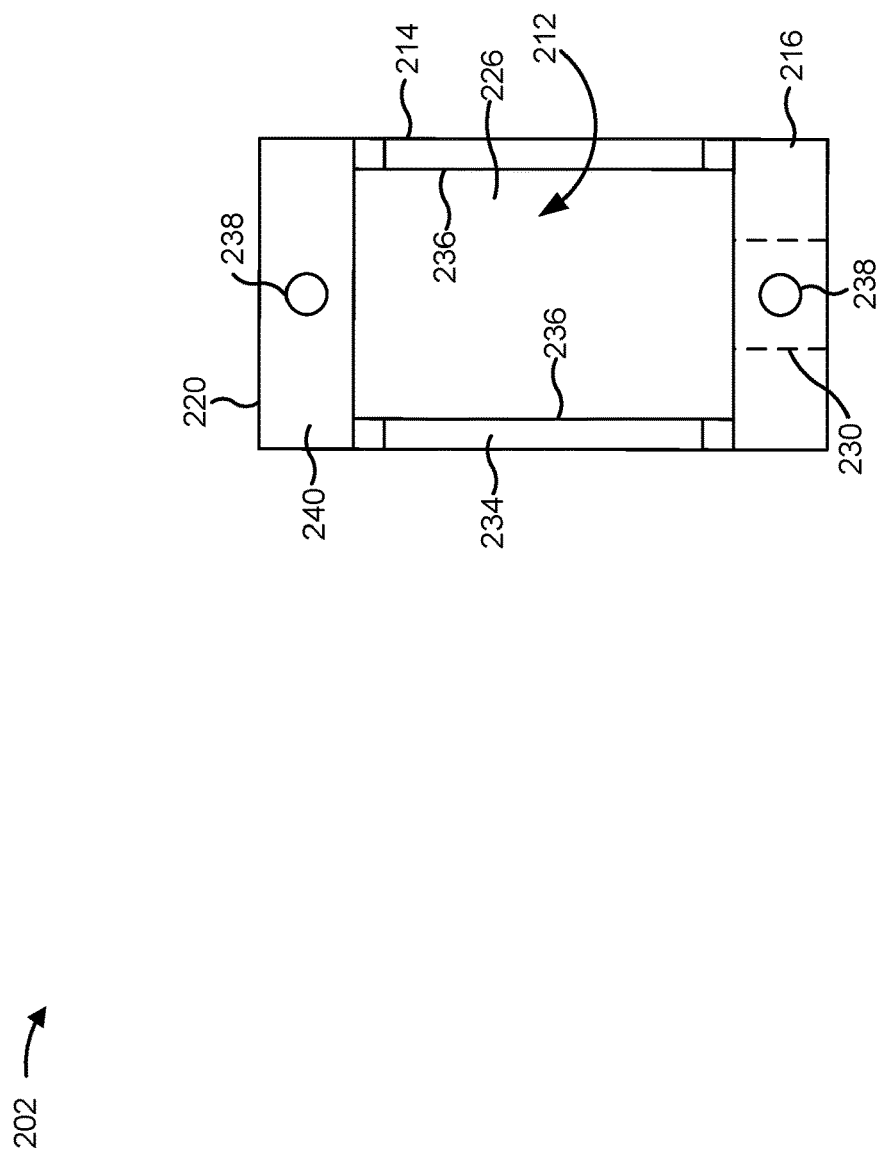

FIGS. 3A-3C are diagrams illustrating examples of the body 202 of the clamp 200. For example, FIG. 3A is a diagram illustrating a front view of the body 202. FIG. 3B is a diagram illustrating a top view of the body 202. FIG. 3C is a diagram illustrating a side view of the body 202.

As shown in FIGS. 3A-3C, the body 202 may include the recess 226. For example, an inner surface 234 of the channel 212 (e.g., a face of the channel 212) may include a recessed portion (e.g., the recess 226). For example, the recess 226 may extend into the inner surface 234 along the x-axis. In some implementations, the cushion 204 may be configured to be removably inserted at least partially into the recess 226. For example, the recess 226 may inhibit movement of the cushion 204. For example, after the cushion 204 is inserted into the recess 226, sides 236 of the recess 226 may inhibit movement of the cushion 204 (e.g., along the z-axis). As shown, the recess 226 may have a height (e.g., along the y-axis) that is approximately the same as (e.g., within a tolerance of) a height of the channel 212. A width of the recess 226 (e.g., along the z-axis) may be less than a width of the channel 212. In some implementations, the recess 226 may have a depth (e.g., along the x-axis). The depth may be a distance that the recess 226 extends into the inner surface 234 of the channel 212. In some implementations, the depth of the recess 226 may be between 1 millimeter and 5 millimeters. More specifically, the depth of the recess 226 may be between 1.5 millimeters and 3 millimeters. In some implementations, the depth of the recess 226 may be 2 millimeters.

The body 202 may include one or more holes 238 extending a depth into the body 202 (e.g., along the x-axis). In some implementations, the one or more holes 238 may be blind (e.g., the one or more holes 238 may not extend through the body 202). The one or more holes 238 may be associated with mechanically connecting the cap 206 to the body 202. For example, the one or more holes 238 may be configured to receive respective fasteners that are used to mechanically connect the cap 206 to the body 202, as described elsewhere herein. For example, the cap 206 may include one or more apertures configured to receive one or more fasteners (e.g., as depicted and described in more detail in connection with FIGS. 4A-4C). The one or more holes 238 may be configured to receive the one or more fasteners to enable the cap 206 to be fastened to the body 202. In some implementations, the depth and/or diameter of the holes 238 may be based on a type (and/or size) of one or more fasteners used to mechanically connect the cap 206 to the body 202.

In some implementations, the one or more holes 238 may have a diameter between 1 millimeter and 4 millimeters. In some implementations, the one or more holes 238 may have a diameter of 2.5 millimeters.

As shown in FIGS. 3A-3C, the one or more holes 238 may be included in a face 240 of the body 202. For example, the face 240 may include the channel 212. In some implementations, the one or more holes 238 may be centered along a depth of the body 202 (e.g., along the z-axis). In some implementations, the base portion 216 may include at least one of the one or more holes 238 and the second member 220 may include at least one of the one or more holes 238. For example, as shown in FIGS. 3A-3C, the base portion 216 may include a hole 238 (e.g., a single hole 238) at the face 240 and the second member 220 may include a hole 238 (e.g., a single hole 238) at the face 240. In other implementations, the base portion 216 and/or the second member 220 may include multiple holes 238 at the face 240.

In some implementations, a thickness 242 of the base portion 216 may be at least 6 millimeters. This may ensure that the base portion 216 has a sufficient strength to support the clamping of the one or more flexible lines 110 as the device 105 moves. For example, the movement of the device 105 may introduce stresses into the body 202. The thickness 242 of the base portion 216 may ensure that the body 202 can withstand the stresses introduced by clamping the one or more flexible lines 110. In some implementations, the body 202 may have a height (e.g., along the y-axis) of between 25 millimeters and 50 millimeters. More specifically, the body 202 may have a height of between 33 millimeters and 40 millimeters. In some implementations, the body 202 may have a height of 37 millimeters. In some implementations, the body 202 may have a width (e.g., along the x-axis) of between 30 millimeters and 60 millimeters. More specifically, the body 202 may have a width of between 40 millimeters and 50 millimeters. In some implementations, the body 202 may have a width of 44 millimeters. In some implementations, the body 202 may have a depth (e.g., along the z-axis) of between 10 millimeters and 30 millimeters. More specifically, the body 202 may have a depth of between 15 millimeters and 25 millimeters. In some implementations, the body 202 may have a depth of 20 millimeters.

The dimensions (e.g., the height, width, and depth) of the body 202 may enable the clamp 200 to be used in scenarios with tight or limited spatial requirements. For example, the dimensions (e.g., the height, width, and depth) of the body 202 may enable the clamp 200 to be used in scenarios where multiple flexible lines 110 are to be clamped, but there is only space for a single clamp. Therefore, the clamp 200 may be used (e.g., because of the dimensions of the body 202 and/or of the clamp 200) to clamp the multiple flexible lines 110 while also ensuring that the spatial separation 210 is maintained between the multiple flexible lines 110, as described elsewhere herein.

In some implementations, the body 202 may have other configurations. For example, as shown in FIGS. 3A-3C, the channel 212 of the body 202 may form a "C" shape, where a portion of the base portion 216, the first member 218, and the second member 220 define the channel 212 (e.g., with an opening of the C shape facing outwards toward the face 240). In other implementations, the channel 212 may form a "U" shape, with an opening of the channel 212 facing upward or downward relative to the base portion 216 (e.g., along the y-axis). In other words, rather than the opening of the channel 212 facing outward along the x-axis (e.g., as shown in FIGS. 3A-3C), the opening of the channel 212 may face outward along the y-axis in some examples. For example, rather than the second member 220 extending substantially perpendicular from a top of the first member 218, the second member 220 may extend substantially perpendicular to the base portion 216 (e.g., extend along the y-axis) at, or near, the face 240 (e.g., such that the second member 220 is substantially parallel to the first member 218). In such examples, the one or more holes 238 may be included in the first member 218 and the second member 220, and the cap 206 may be mechanically connected to the first member 218 and the second member 220 in a similar manner as described elsewhere herein.

In some other implementations, the upper portion 214 may be a separate piece from the base portion 216. For example, the upper portion 214 may include the first member 218 and the second member 220 in a similar configuration as depicted in FIGS. 3A-3C. The upper portion 214 may include another member extending substantially perpendicularly from the second member 220 (e.g., at, or near, the face 240) along the y-axis toward the base portion 216. The first member 218, the second member 220, and the other member may define the channel 212. In such examples, the cushion 204 may be inserted into the channel 212. The upper portion 214 (e.g., with the cushion inserted into the channel 212) may be mechanically connected to the base portion 216 (e.g., such that an opening of the channel 212 is facing the base portion 216. This may secure the cushion 204 in place. In such examples, the clamp 200 may not include the cap 206.

Each of the illustrated x-axis, y-axis, and z-axis in FIGS. 3A-3C is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

As indicated above, FIGS. 3A-3C are provided as examples. Other examples may differ from what is described with regard to FIGS. 3A-3C.

Figure 4A:
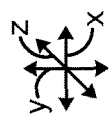
FIGS. 4A-4C are diagrams illustrating examples of a cap of the clamp.
Figure 4A:
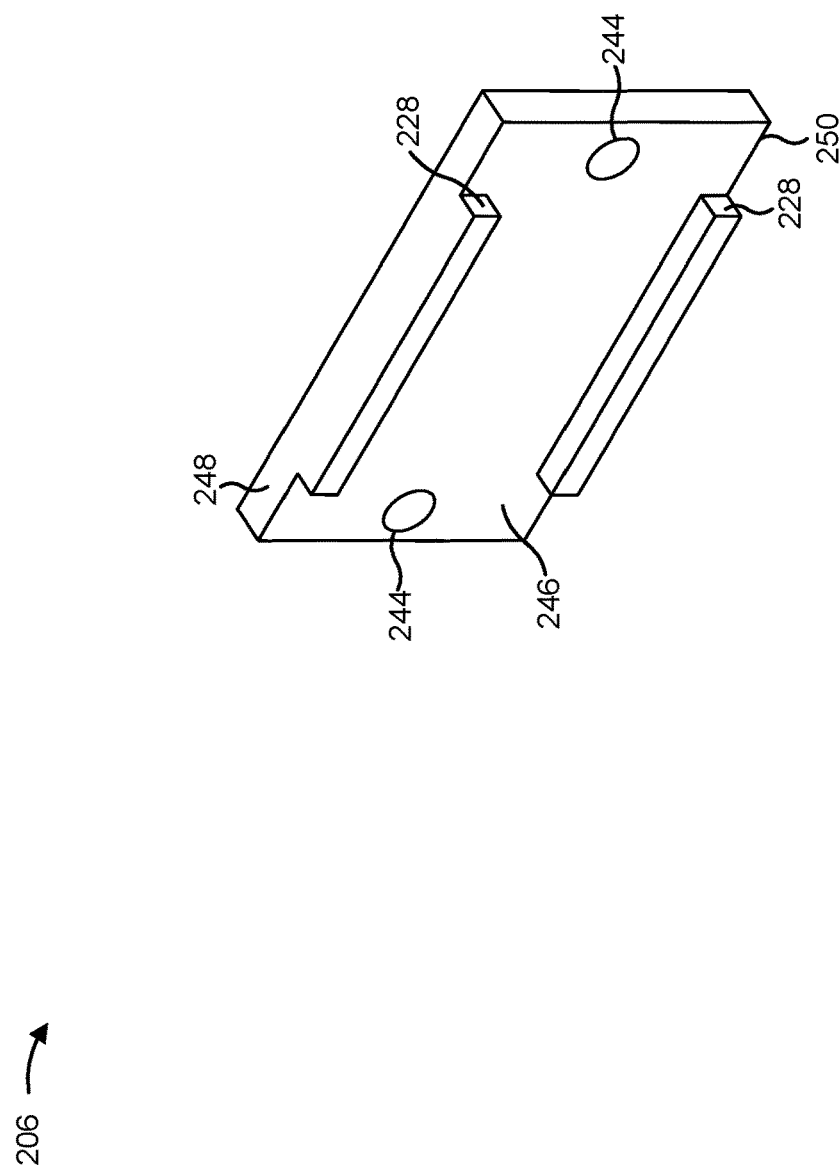
Figure 4B:
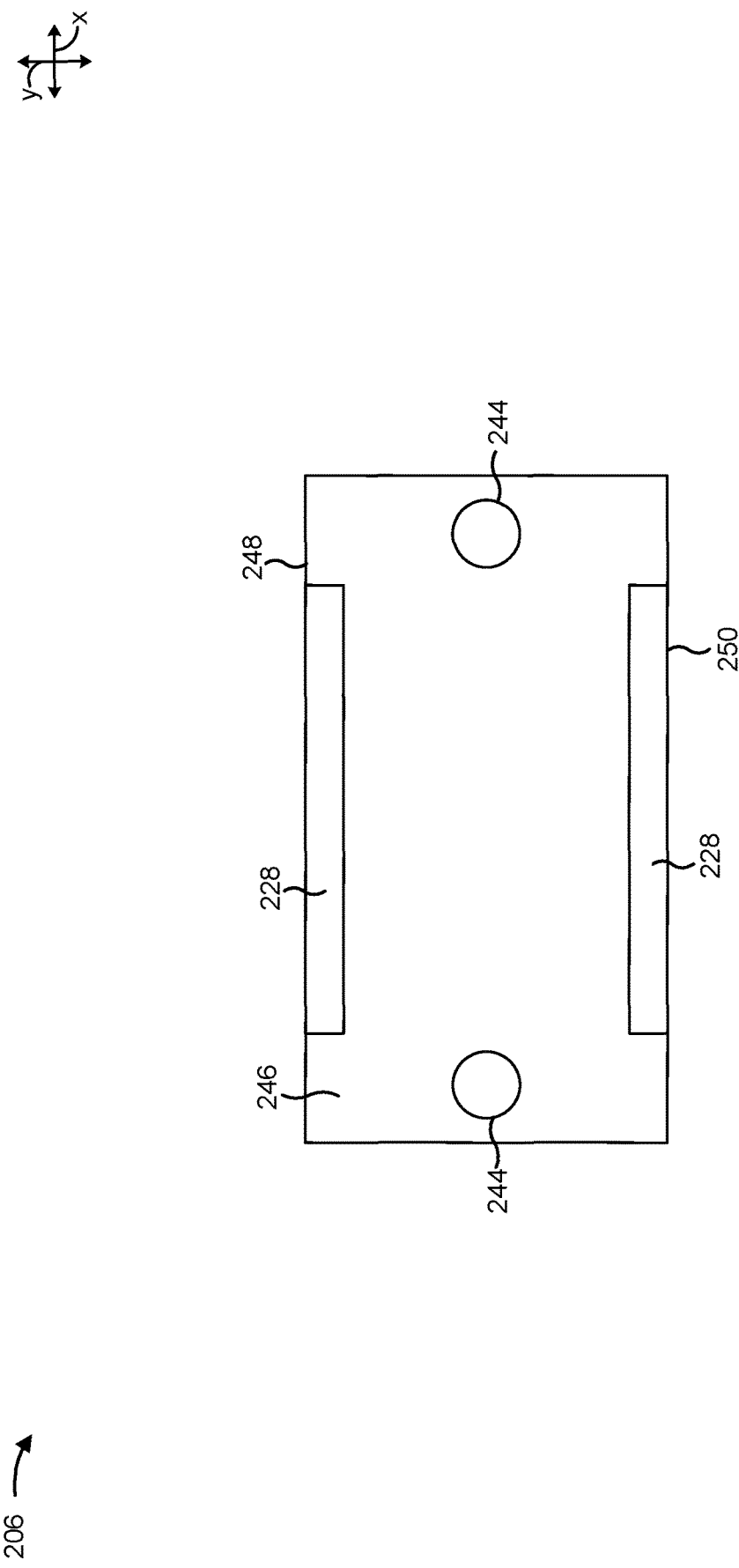
Figure 4C:
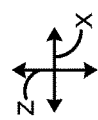
Figure 4C:
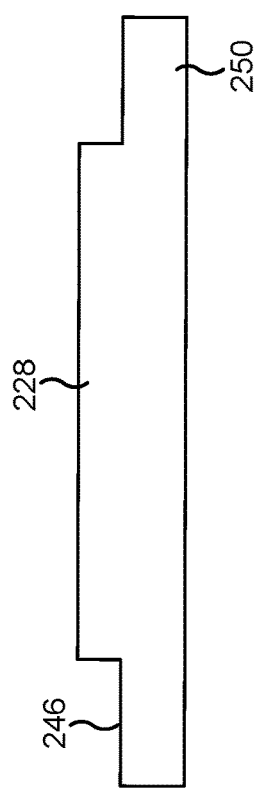

FIGS. 4A-4C are diagrams illustrating examples of the cap 206 of the clamp 200. For example, FIG. 4A is a diagram illustrating a perspective view of the cap 206. FIG. 4B is a diagram illustrating a front view of the cap 206. FIG. 4C is a diagram illustrating a side view of the cap 206.

As described elsewhere herein, the cap 206 may be configured to be fastened to the body 202 over the opening of the channel 212 to secure the cushion 204 in place (e.g., after the cushion 204 is inserted into the channel 212). In some implementations, the cap 206 may be removably connected to the body 202 (e.g., the cap 206 may be configured to be removed from the body 202). For example, the cap 206 may be configured to be fastened to the body 202 via one or more fasteners (e.g., one or more screws, bolts, studs, or other fasteners). In some other examples, the cap 206 may be removably connected to the body 202 via other means. As shown in FIGS. 4A-4C, the cap 206 may include one or more apertures 244. The one or more apertures 244 may extend through the cap 206 (e.g., along the z-axis). The one or more apertures 244 may be configured to receive the one or more fasteners. For example, to secure or fix the cap 206 to the body 202, a fastener may be placed through an aperture 244 and into a hole 238 of the body 202 to mechanically connect the cap 206 to the body 202. For example, a location of the one or more apertures 244 on the cap 206 may enable the one or more apertures 244 to align with respective holes 238 when the cap 206 is placed on the body 202. In other words, a quantity of apertures 244 and/or a location of the aperture(s) 244 on the cap 206 may be based on (e.g., may correspond to) a quantity of holes 238 and/or a location of the hole(s) 238 on the body 202.

The cap 206 may include the one or more lips 228. The one or more lips 228 may extend from an inner surface 246 of the cap 206 (e.g., along the z-axis). The one or more lips may be included at, or near, respective sides of the cap 206. For example, a first lip 228 may be included at a first side 248 of the cap 206. A second lip 228 may be included at a second side 250 of the cap 206. As shown in FIGS. 4A-4C, the cap 206 may include multiple (e.g., two, as shown) lips 228. The multiple lips 228 may extend substantially parallel to one another along the cap 206 (e.g., along the x-axis), such as along sides (e.g., the first side 248 and/or the second side 250) of the cap 206.

A lip 228 may extend a distance from the inner surface 246 (e.g., along the z-axis). In some implementations, the distance may be between 0.5 millimeters and 6 millimeters. More specifically, the distance may be between 1 millimeter and 4 millimeters. In some implementations, the distance may be 2 millimeters. The distance may enable the lip 228 to secure the cushion 204 when the cushion is inserted into the channel 212 and when the cap 206 is secured to the body 202, as described elsewhere herein. A location of the one or more lips 228 on the inner surface 246 (e.g., along the x-axis) may be based on a location of the opening of the channel 212 on the body 202. In other words, the one or more lips 228 may be positioned on the cap 206 to align with the opening of the channel 212 when the cap 206 is fixed to the body 202.

For example, the one or more lips 228 may be configured to restrict movement of the cushion 204 after the cushion 204 is inserted into the channel 212 of the body 202. For example, the one or more lips 228 (e.g., and the recess 226) may be configured to restrict movement of the cushion 204 when the cap 206 is fastened to the body 202. For example, when the cap 206 is fastened to the body 202, the one or more lips may extend along a height of the body 202 (e.g., along the y-axis as depicted in FIGS. 3A-3C). The inner surface 246 of the cap 206 may be configured to contact the face 240 of the body 202 when the cap 206 is fastened to the body 202. As a result, the one or more lips 228 may extend into the channel 212 (e.g., as depicted in FIGS. 2A and 2C). For example, the one or more lips 228 have a length (e.g., along the x-axis as depicted in FIGS. 4A-4C)) that is the same as, or close to (e.g., within a tolerance of) a height of the channel 212 (e.g., along the y-axis as depicted in FIGS. 3A-3C). For example, the one or more lips 228 may extend (e.g., along the x-axis) less than an entire length of the cap 206.

Therefore, when the cushion 204 is inserted into the channel 212 and the cap 206 is fixed to the body 202, the sides 236 of the recess 226 may inhibit movement of the cushion 204 at a first side of the cushion 204 (e.g., near the inner surface 234 of the channel 212) and the one or more lips 228 may inhibit movement of the cushion at a second side of the cushion 204 (e.g., near the opening of the channel 212). For example, the sides 236 and the one or more lips 228 may inhibit movement of the cushion 204 along the z-axis as depicted in FIGS. 2A-2C. This may reduce a likelihood that the cushion 204 becomes dislodged from the body 202 during operation of the device 105.

Each of the illustrated x-axis, y-axis, and z-axis in FIGS. 4A-4C is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

As indicated above, FIGS. 4A-4C are provided as examples. Other examples may differ from what is described with regard to FIGS. 4A-4C.

Figure 5A:
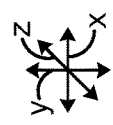
FIGS. 5A-5C are diagrams illustrating examples of a cushion of the clamp.
Figure 5A:
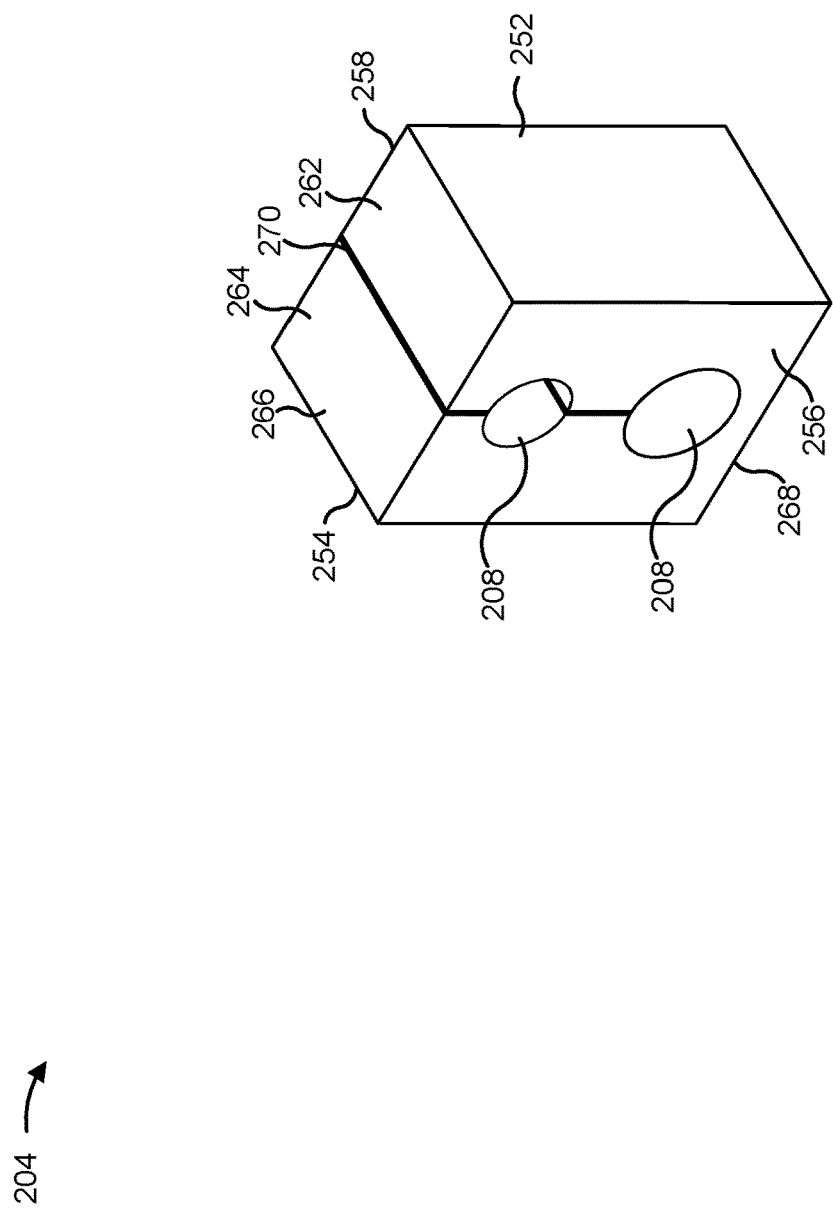
Figure 5B:
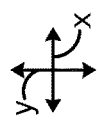
Figure 5B:
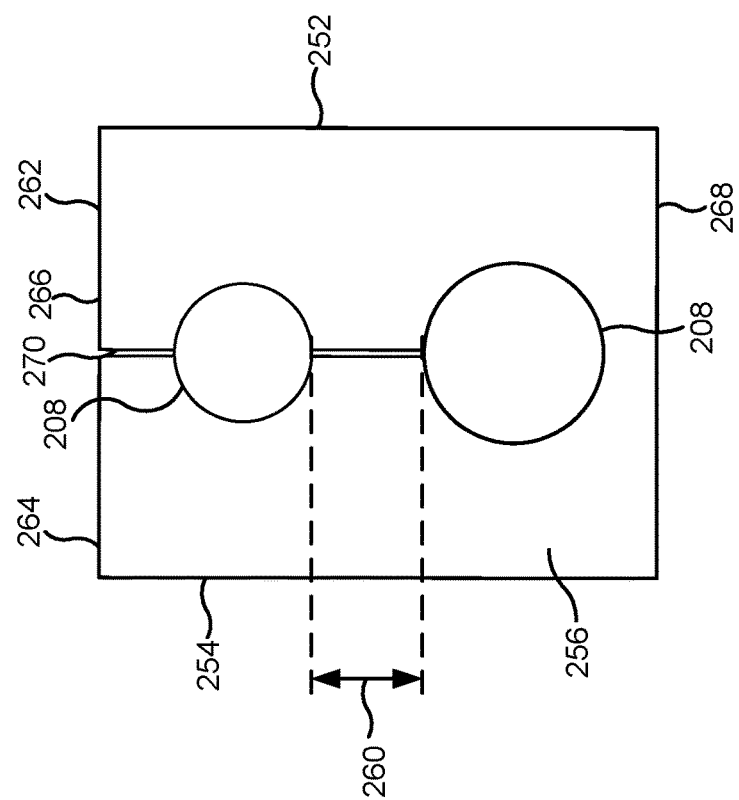
Figure 5C:
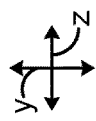
Figure 5C:
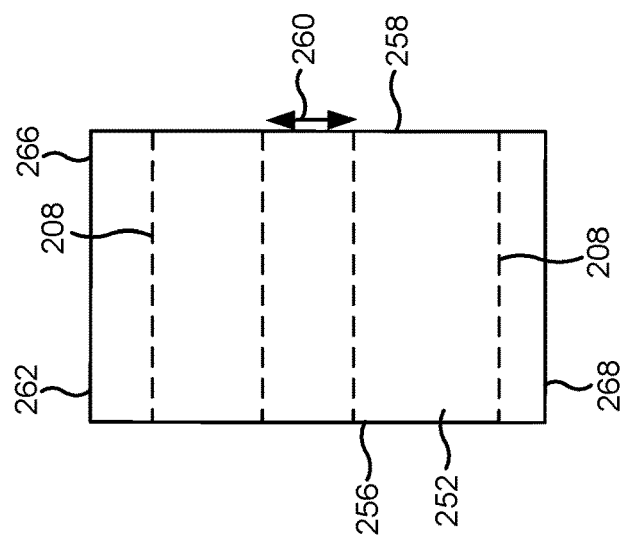

FIGS. 5A-5C are diagrams illustrating examples of the cushion 204 of the clamp 200. For example, FIG. 5A is a diagram illustrating a perspective view of the cushion 204. FIG. 5B is a diagram illustrating a front view of the cushion 204. FIG. 5C is a diagram illustrating a side view of the cushion 204. In some implementations, the cushion 204 may be referred to as an insert.

The cushion 204 may have an approximately rectangular shape or configuration. As described herein, the cushion 204 may be configured to be removably inserted at least partially into the recess 226 of the body 202 (e.g., into the channel 212 of the body 202). For example, a first side 252 or a second side 254 of the cushion 204 may be configured to be removably inserted at least partially (or fully) into the recess 226 of the body 202, such that the first side 252 or the second side 254 contact an inner surface of the recess 226. For example, when the cushion 204 is inserted into the body 202, the through holes 208 of the cushion 204 may face toward the front face 222 of the body 202.

The cushion 204 may include two or more through holes 208 extending through the cushion 204 (e.g., along the z-axis). For example, the through holes 208 may extend from a front side 256 of the cushion 204 to a back side 258 of the cushion 204 (e.g., along the z-axis). As described elsewhere herein, the through holes 208 may be configured to receive respective flexible lines 110. For example, a single flexible line 110 may pass through a given through hole 208 to facilitate a clamping of the single flexible line 110.

Pairs of through holes 208 may be separated by respective distances. For example, as shown in FIGS. 5B and 5C, a first through hole 208 and a second through hole 208 may be separated by a distance 260. In some implementations, the distances between the two or more through holes 208 may satisfy one or more thresholds. In other words, pairs of through holes 208 of the cushion 204 may be separated by respective distances. The respective distances may satisfy respective thresholds. For example, a value of a threshold for a distance between two given through holes 208 may be based on a size or diameter of the two given through holes (e.g., larger through holes 208 may be associated with larger thresholds), and/or a type of flexible line 110 to be clamped by the clamp 200, among other examples. For example, the distances between the two or more through holes 208 satisfying the one or more thresholds may ensure, or facilitate, the flexible lines 110 maintaining the spatial separation 210 when the flexible lines 110 are secured to the device 105 via the clamp 200.

Figure 6A:
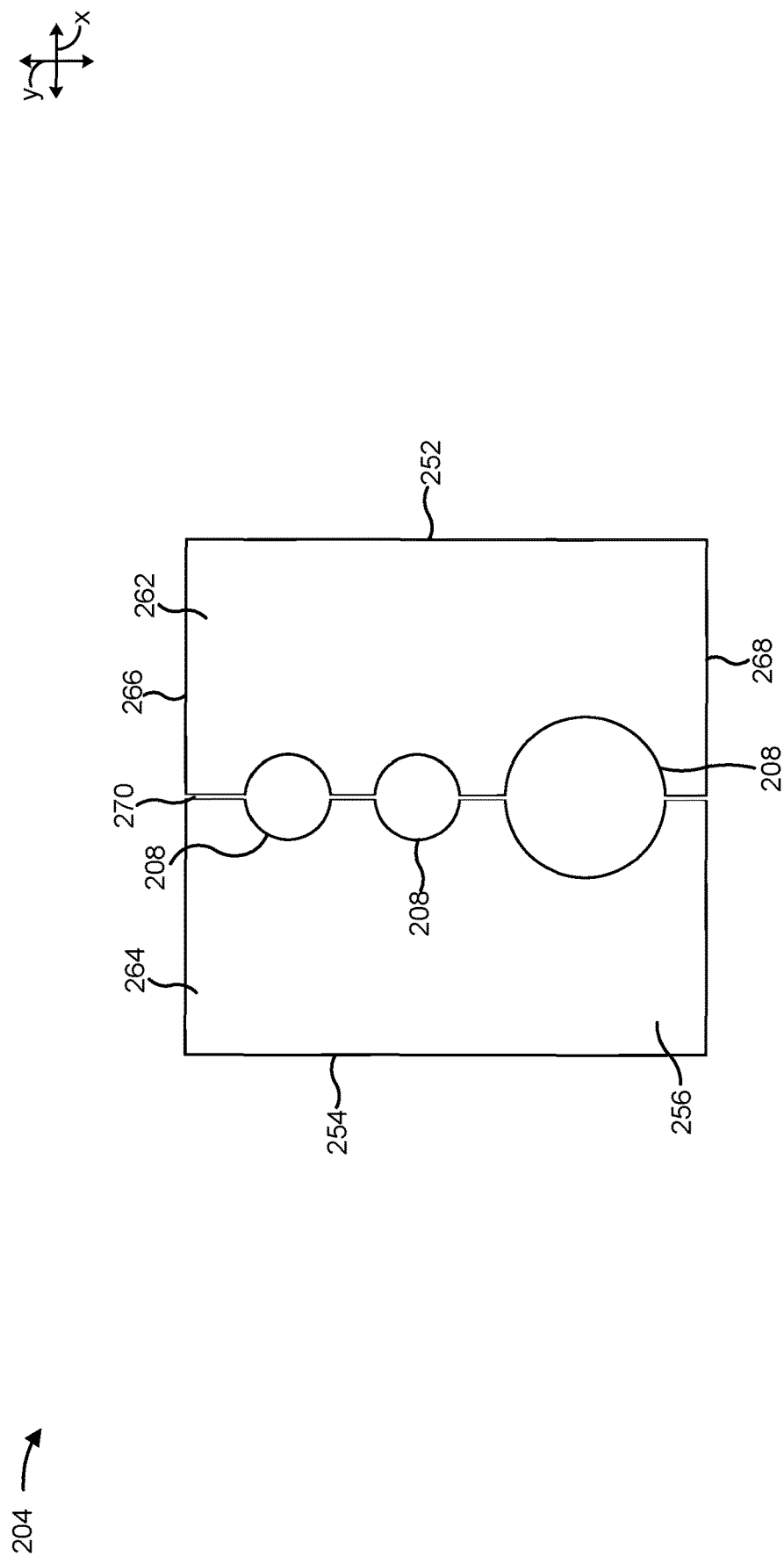
FIGS. 6A and 6B are diagrams illustrating examples of the cushion.
Figure 6B:
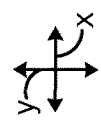
Figure 6B:
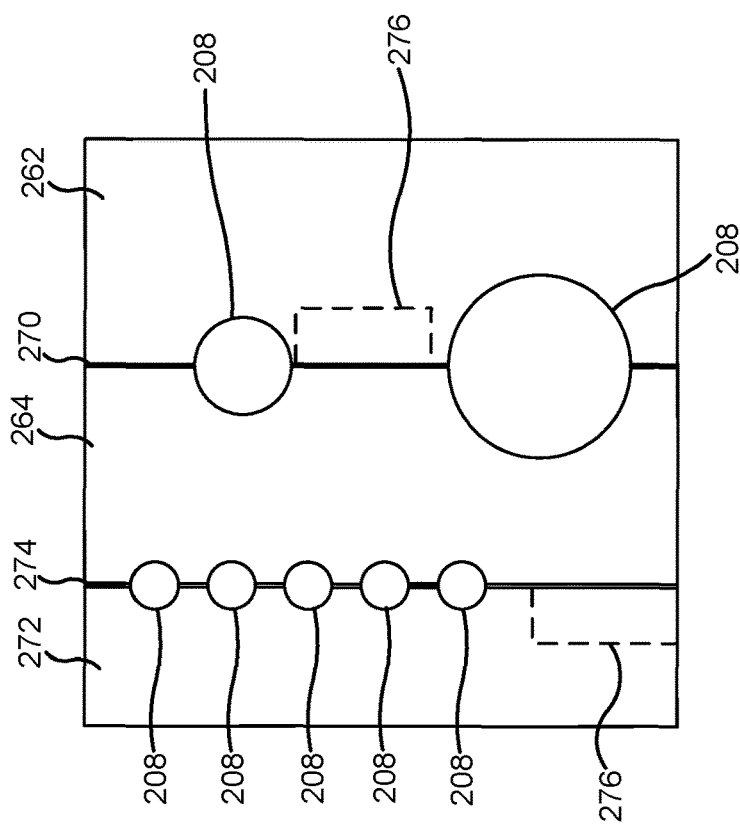
Figure 6B:

In some implementations, the cushion 204 may be at least partially split into a first section 262 and a second section 264. The split may run from the front side 256 to the back side 258 of the cushion 204 (e.g., along the z-axis). FIGS. 5A-5C depict an example of a partially split cushion 204. For example, the cushion 204 may be split at a top surface 266 of the cushion 204, but may not be split at a bottom surface 268 of the cushion 204. In other examples, the cushion 204 may be split (e.g., fully split) into two or more sections (e.g., the cushion 204 may include two or more sections, such as the first section 262 and the second section 264). A cushion 204 that is fully split into the two or more sections is depicted in FIGS. 2C, 6A, and 6B. The split (e.g., partial or full) may enable the one or more flexible lines 110 to be inserted into respective through holes 208. For example, if the cushion 204 is partially split into the first section 262 and a second section 264, the first section 262 may be pulled away from the second section 264 (e.g., because the cushion 204 may include a flexible material) to create an opening (e.g., in the top surface 266) for the flexible line(s) to be inserted into the through holes 208 (e.g., via the top surface 266). In examples where the cushion 204 is fully split into the first section 262 and a second section 264, the first section 262 may be placed around a first side of a flexible line 110 and the second section 264 may be placed around a second side of the flexible line 110 to insert the flexible line 110 into a given through holes 208. After the flexible line(s) 110 are inserted into respective through holes 208, the cushion 204 may be inserted into the body 202 (e.g., into the channel 212) and the cap may be secured to the body 202, as described in more detail elsewhere herein.

In some implementations, at least one through hole 208, of the two or more through holes 208 of the cushion 204, may be defined by an interface 270 between the first section 262 and the second section 264. For example, the first section 262 may include a first portion of a through hole 208 (e.g., half of a through hole 208) and the second section 264 may include a second portion of the through hole 208 (e.g., another half of the through hole 208). When the first section 262 and the second section 264 come into contact, the first portion and the second portion may define the through hole 208.

In some implementations, the two or more through holes 208 may be aligned along the cushion 204 (e.g., along the y-axis). For example, a center of each through hole 208 may be aligned vertically along the cushion 204 (e.g., along they-axis). For example, the center of each through hole 208 may be at the interface 270 between the first section 262 and the second section 264. In other examples, the two or more through holes 208 may not be aligned and/or may be located at different positions on the cushion 204.

In some implementations, the two or more through holes 208 may include a first one or more through holes 208 having a first diameter and a second one or more through holes 208 having a second diameter. For example, as shown in FIGS. 5A-5C, a first through hole 208 may have a larger diameter than a second through hole 208. In other examples, the through holes 208 included in the cushion 204 may have the same diameter. This may add flexibility for the clamp 200 to be used to secure different types or sizes of flexible lines 110 using the same clamp 200.

In some implementations, the cushion 204 may have a depth (e.g., along the z-axis) that reduces a likelihood that the flexible lines 110 bend or kink when secured by the clamp 200. For example, the depth of the cushion 204 may be sufficient to spread or distribute stress or forces along a distance of a flexible line 110 (e.g., corresponding to the depth of the cushion 204) such that the flexible line does not bend or kink during an operation or movement of the device 105. For example, the cushion 204 may have a depth of at least 16 millimeters. The depth (e.g., of at least 16 millimeters) may ensure that forces or stresses are sufficiently distributed over a length of a flexible line 110 to prevent (or reduce a likelihood of) bending or kinking of the flexible line at the clamp 200.

Each of the illustrated x-axis, y-axis, and z-axis in FIGS. 5A-5C is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

As indicated above, FIGS. 5A-5C are provided as examples. Other examples may differ from what is described with regard to FIGS. 5A-5C.

FIGS. 6A and 6B are diagrams illustrating examples of the cushion 204. As shown in FIGS. 6A and 6B, the cushion 204 may be associated with different configurations of through holes 208 (e.g., different quantities, locations, and/or sizes of through holes 208).

For example, as shown in FIG. 6A, the cushion 204 may include three through holes 208. For example, a first through hole 208 may have a first diameter. A second through hole 208 and a third through hole 208 may have a second diameter. As shown in FIG. 6A, the three through holes 208 may be aligned vertically along a height of the cushion 204 (e.g., along the y-axis). This may enable three flexible lines 110 to be secured by the clamp 200. In some implementations, the cushion 204 depicted in FIG. 6A and the cushion 204 depicted in FIGS. 5A-5C may be used interchangeably with the same body 202 and/or the same cap 206. In other words, cushions 204 that have different configurations may be changed out and used at different times with the same clamp 200 (e.g., the same body 202 and/or the same cap 206).

As shown in FIG. 6B, in some implementations, the cushion 204 may include more than two sections. For example, the cushion 204 may include the first section 262, the second section 264, and a third section 272. Including more than two sections in the cushion 204 may provide increased flexibility for configuration of different types, sizes, and/or quantities of through holes 208 (e.g., as shown in FIG. 6B). For example, the cushion 204 may include one or more through holes 208 at a first interface (e.g., the interface 270 between the first section 262 and the second section 264) and a second one or more through holes at a second interface (e.g., an interface 274 between the second section 264 and the third section 272) of the sections of the cushion 204.

In some implementations, the two or more sections of the cushion 204 may be removably connected via one or more tongue-and-groove connections 276. For example, an interface between two sections may include interlocking mechanisms (e.g., one or more tongue-and-groove connections 276) to connect the two sections together. In other examples, other means of connecting the two sections together may be used, such as coarse teeth or other mechanical means. This may reduce a likelihood of the cushion 204 being dislodged from the channel 212 during operation of the device 105. For example, in examples where the cushion 204 includes more than two sections, one or more sections may not be in direct contact with the recess 226 and/or the one or more lips 228. Therefore, there may be no direct lateral support (e.g., along the z-axis as depicted in FIGS. 2A-2C) for the one or more sections. The tongue-and-groove connections 276 may provide lateral support (e.g., along the z-axis as depicted in FIGS. 2A-2C) for the one or more sections that are not to be in direct contact with the recess 226 and/or the one or more lips 228 after the cushion 204 is inserted into the body 202, as described in more detail elsewhere herein.

Each of the illustrated x-axis and y-axis in FIGS. 6A and 6B are substantially perpendicular to each other. In other words, the x-axis is substantially perpendicular to the y-axis, and the y-axis is substantially perpendicular to the x-axis. In some cases, a single reference number is shown to refer to a surface, or fewer than all instances of a part may be labeled with all surfaces of that part. All instances of the part may include associated surfaces of that part despite not every surface being labeled.

As indicated above, FIGS. 6A and 6B are provided as examples. Other examples may differ from what is described with regard to FIGS. 6A and 6B.

In some implementations, a routing clamp includes a rigid body defining a channel; a flexible cushion that is configured to be inserted into the channel, wherein the flexible cushion includes two or more through holes extending through the flexible cushion that are configured to receive flexible lines, and wherein distances between the two or more through holes satisfy a threshold; and a rigid cap that is configured to be fastened to the rigid body over an opening of the channel, wherein the rigid cap includes one or more lips that are configured to restrict movement of the flexible cushion after the flexible cushion is inserted into the channel.

In some implementations, a routing clamp includes a body including a base portion and an upper portion defining a channel, wherein an inner surface of the channel includes a recessed portion; and a flexible cushion that is configured to be inserted into the channel and the recessed portion, wherein the flexible cushion includes a plurality of through holes extending through the flexible cushion, and wherein the plurality of through holes are configured to receive and inhibit movement of at least one line.

In some implementations, a system includes a device; one or more flexible lines; and a clamp fixed to the device, wherein the clamp secures the one or more flexible lines with respect to the device, and wherein the clamp comprises: a rigid body including a base portion and a channel, wherein the clamp is fixed to the device via the base portion; a flexible cushion that is removable from the channel, wherein the flexible cushion includes two or more through holes that are separated by respective distances, and wherein the one or more flexible lines run through respective through holes of the two or more through holes; and a rigid cap that is configured to be fastened to the rigid body over an opening of the channel.

The foregoing disclosure provides illustration and description but is not intended to be exhaustive or to limit the implementations to the precise forms disclosed. Modifications and variations may be made in light of the above disclosure or may be acquired from practice of the implementations described herein.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A routing clamp, comprising:
    a body defining a channel, wherein:
        the body includes one or more blind holes extending a depth into the body along a first axis,
        the one or more blind holes and the channel are included in a face of the body,
        the body includes a tab extending away from the channel along the first axis,
        the tab includes one or more first apertures that pass through the tab along a second axis perpendicular to the first axis, and
        the one or more first apertures are configured to receive one or more first fasteners to fasten the routing clamp to a device;
    a cushion that is configured to be inserted into the channel, wherein:
        the cushion includes a first through hole extending through the cushion that is configured to receive a first line,
        the cushion includes a second through hole extending through the cushion that is configured to receive a second line, and
        a distance between the first through hole and the second through hole satisfies a threshold distance to maintain a spatial separation between the first line and the second line; and
    a cap that is configured to be fastened to the body over an opening of the channel, wherein:
        the cap includes one or more second apertures aligned with the one or more blind holes of the body,
        the one or more second apertures and the one or more blind holes of the body are configured to receive one or more second fasteners to fasten the cap to the body,
        the cap includes one or more lips that extend into the channel when the cap is fastened to the body,
        the one or more lips are configured to restrict movement of the cushion after the cushion is inserted into the channel, and
        the cap and the body are more rigid than the cushion.

2. The routing clamp of claim 1, wherein the body includes a base portion and an upper portion, wherein the upper portion defines the channel.

3. The routing clamp of claim 2, wherein the upper portion includes a first member extending perpendicular from the base portion along the second axis and a second member extending perpendicular from the first member along the first axis, wherein the base portion, the first member, and the second member define the channel.

4. The routing clamp of claim 1, wherein the cushion is at least partially split into a first section and a second section.

5. The routing clamp of claim 1, wherein the cushion has a depth of at least 16 millimeters.

6. The routing clamp of claim 1, wherein the device is associated with one or more chemical applications, and wherein materials of the body, the cushion, and the cap are compatible with the one or more chemical applications.

7. The routing clamp of claim 1, wherein the first through hole has a first diameter and the second through hole has a second diameter.

8. A routing clamp, comprising:
    a body including a base portion and an upper portion defining a channel, wherein an inner surface of the channel includes a recessed portion, wherein:
        the body includes one or more blind holes extending a depth into the body along a first axis,
        the one or more blind holes and the channel are included in a face of the body,
        the body includes a tab extending away from the channel along the first axis,
        the tab includes one or more first apertures that pass through the tab along a second axis perpendicular to the first axis, and the one or more first apertures are configured to receive one or more first fasteners to fasten the routing clamp to a device;

a cushion that is configured to be inserted into the channel and the recessed portion, wherein the cushion includes a plurality of through holes extending through the cushion, and wherein the plurality of through holes are configured to receive and inhibit movement of at least one line; and a cap that is configured to be fastened to the body over an opening of the channel, wherein:

the cap includes one or more second apertures aligned with the one or more blind holes of the body, the one or more second apertures and the one or more blind holes of the body are configured to receive one or more second fasteners to fasten the cap to the body, and the cap includes one or more lips that extend into the channel when the cap is fastened to the body.

9. The routing clamp of claim 8, wherein the one or more lips and the recessed portion are configured to restrict movement of the cushion when the cap is fastened to the body.

10. The routing clamp of claim 8, wherein the base portion and the upper portion are included in a single unitary piece forming the body.

11. The routing clamp of claim 8, wherein the base portion and the upper portion are separate pieces forming the body.

12. The routing clamp of claim 8, wherein a thickness of the base portion is at least 6 millimeters.

13. The routing clamp of claim 8, wherein the cushion includes two or more sections.

14. The routing clamp of claim 13, wherein the two or more sections are removably connected via one or more tongue and groove connections.

15. The routing clamp of claim 8, wherein a first material of the body includes at least one of stainless steel or polyether ether ketone (PEEK), and wherein a second material of the cushion includes at least one of rubber, polytetrafluoroethylene, or ethylene propylene diene monomer (EPDM) rubber.

16. A system, comprising:

a device;

one or more lines; and a clamp fixed to the device, wherein the clamp secures the one or more lines with respect to the device, and wherein the clamp comprises:

a body including a base portion and a channel, wherein the clamp is fixed to the device via the base portion, wherein:

the body includes one or more blind holes extending a depth into the body along a first axis, the one or more blind holes and the channel are included in a face of the body, the body includes a tab extending away from the channel along the first axis, the tab includes one or more first apertures that pass through the tab along a second axis perpendicular to the first axis, and the one or more first apertures are configured to receive one or more first fasteners to fasten the clamp to the device;

a cushion that is removable from the channel, wherein:

the cushion includes a first through hole extending through the cushion that is configured to receive a first line, the cushion includes a second through hole extending through the cushion that is configured to receive a second line, and a distance between the first through hole and the second through hole satisfies a threshold distance to maintain a spatial separation between the first line and the second line; and a cap that is configured to be fastened to the body over an opening of the channel, wherein:

the cap includes one or more second apertures aligned with the one or more blind holes of the body, the one or more second apertures and the one or more blind holes of the body are configured to receive one or more second fasteners to fasten the cap to the body, the cap includes one or more lips that extend into the channel when the cap is fastened to the body, and the cap and the body are more rigid than the cushion.

17. The system of claim 16, wherein the clamp is configured to restrict a movement of the one or more lines and maintain a second spatial separation between the one or more lines and the device or another surface when the device is moving.

18. The system of claim 16, wherein the device is associated with one or more chemical applications, and wherein a first material of the body, a second material of the cushion, and a third material of the cap are compatible with the one or more chemical applications.

19. The system of claim 18, wherein the first material and the third material are stainless steel, and wherein the second material is a rubber material.

20. The system of claim 16, wherein the cushion includes two or more sections, and wherein the first through hole is defined by an interface between a first section and a second section of the two or more sections.

21. The system of claim 16, wherein the body includes a recessed portion in a face of the channel, wherein the cushion is configured to be removably inserted at least partially into the recessed portion, and wherein the recessed portion inhibits movement of the cushion.

22. The system of claim 16, wherein the one or more lines include at least one of:

a tube, a wire, an air line, a hydraulic line, a conduit, a flexible pipe, or a cable.

23. The routing clamp of claim 4, wherein the first through hole is defined by an interface between a first section and a second section.

24. The routing clamp of claim 1, wherein the first line and the second line include at least one of:

a tube, a wire, an air line, a hydraulic line, a conduit, a flexible pipe, or a cable.

25. The routing clamp of claim 8, wherein the at least one line includes one of:

a tube, a wire, an air line,
a hydraulic line,
a conduit,
a flexible pipe, or
a cable.

\* \* \* \* \*